United States Patent [19]

Uyehara

[11] Patent Number: 4,851,068
[45] Date of Patent: Jul. 25, 1989

[54] METHOD OF MAKING A SEALING ELEMENT

[75] Inventor: Hajime Uyehara, Westminster, Calif.

[73] Assignee: Smith International, Inc., Houston, Tex.

[21] Appl. No.: 146,916

[22] Filed: Jan. 22, 1988

Related U.S. Application Data

[63] Continuation of Ser. No. 878,452, Jun. 25, 1986, abandoned.

[51] Int. Cl.⁴ .......................... B32B 31/22; B32B 31/28
[52] U.S. Cl. .................................. 156/245; 156/272.6; 156/306.9; 156/307.7; 204/164; 427/39
[58] Field of Search .................... 156/272.6, 643, 665, 156/646, 153, 155, 242, 245, 273.5, 273.3, 285, 306.9, 307.7; 17/371, 372; 277/95, 235 R, DIG. 6; 384/477, 481, 130, 139; 427/39–41, 96; 204/164, 165

[56] References Cited

U.S. PATENT DOCUMENTS

| | | | |
|---|---|---|---|
| 2,399,019 | 4/1946 | Grinter | 156/307.7 |
| 2,409,759 | 10/1946 | Hosking | 156/307.7 |
| 3,137,508 | 6/1964 | Cunningham | 277/95 |
| 3,199,878 | 8/1965 | Cunningham | 277/235 |
| 3,381,968 | 5/1968 | Neilson | 277/95 |
| 3,489,421 | 1/1970 | Neilson | 277/235 |
| 3,676,255 | 7/1972 | Voet | 156/307.7 |
| 3,676,256 | 7/1972 | Aboytes | 156/307.7 |
| 3,680,873 | 8/1972 | Garner . | |
| 3,806,392 | 4/1974 | Stuart | 156/307.7 |
| 3,935,348 | 1/1976 | Smith | 156/307.7 |
| 4,213,818 | 7/1980 | Lemons et al. . | |
| 4,349,403 | 9/1982 | Blenner | 427/39 |
| 4,396,450 | 8/1983 | Blenner | 156/272.6 |
| 4,465,547 | 8/1984 | Belke, Jr. et al. . | |
| 4,615,263 | 10/1986 | Gelorme | 427/96 |

Primary Examiner—Merrell C. Cashion, Jr.
Attorney, Agent, or Firm—Robert G. Upton

[57] ABSTRACT

A seal for rock bits having a Belleville type spring and a lock-ring embedded in rubber is made in a process where the spring and the lock-ring are plasma etched before the metal parts are embedded in a partially cured rubber composition. The rubber is cured in a mold to provide a seal having significantly strengthened rubber-to-metal bonding. Preferably, highly saturated nitrile rubber is used for the seal, and the rubber composition preferably also includes lubricating agents which reduce friction between the rubber seal and rotating metal parts of the rock bits.

1 Claim, 2 Drawing Sheets

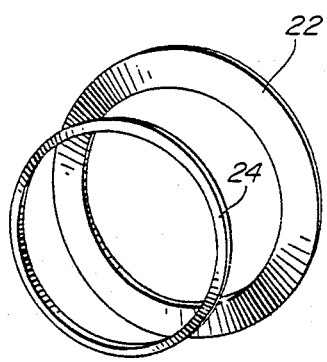
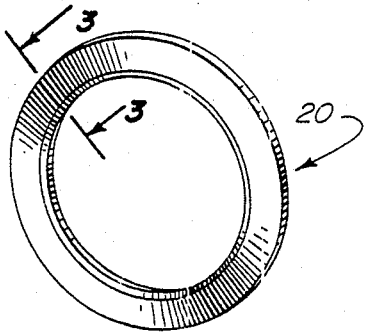
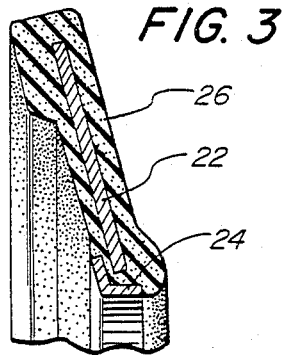
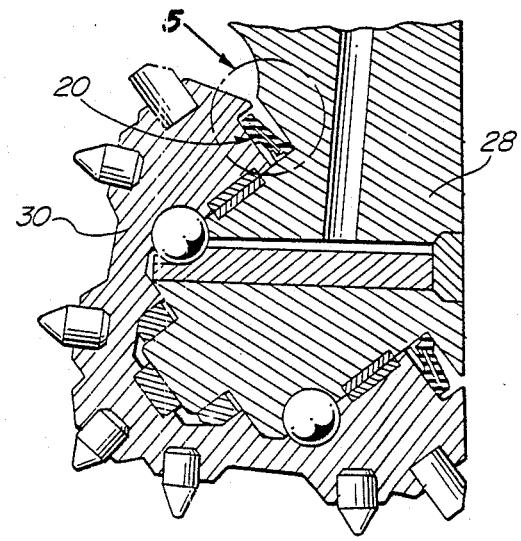
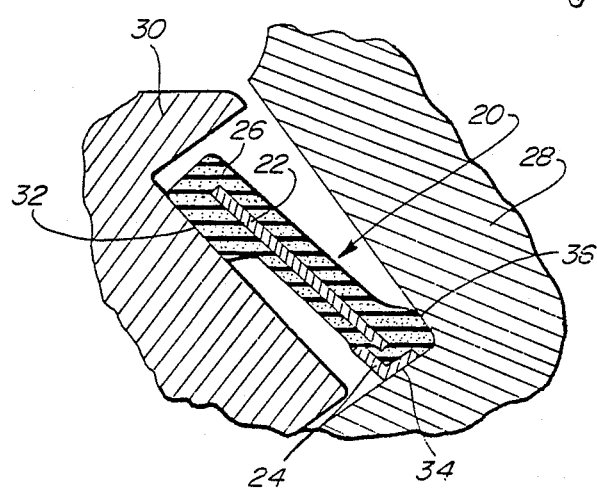

METHOD OF MAKING A SEALING ELEMENT

CROSS-REFERENCE TO RELATED APPLICATION

This application is a continuation of a co-pending application Ser. No. 878,452, filed on June 25, 1986, now abandoned.

BACKGROUND OF THE INVENTION

1. Field of the Invention

The present invention is directed to improvements in composite bearing seals having metal, such as steel, and rubber components. More particularly, the present invention is directed to a seal incorporating a Belleville type spring, wherein bonding of the embedding rubber components to the embedded spring is significantly improved.

2. Brief Description of the Prior Art

Seals for preventing ingress of extraneous material into the interior bearing structure of the rotating roller cones of rock bits have been known in the art for a long time. These seals also serve the function of preventing the loss of lubricant from the interior of the bearing.

One type of rock bit seal structure includes a metal, Belleville type spring which is embedded in rubber or rubber-like material, and forms sealing surfaces coming into contact with the respective sealing surfaces of the journal and rotating roller cones of the rock bits. Such rock bit seals having the basic Belleville spring type structure, and several improvements and variations of such structures are described, for example, in U.S. Pat. Nos. 3,381,968; 3,489,421; 3,199,878; 3,680,873; 3,137,508, and 3,370,895.

U.S. Pat. No. 3,370,895, the specification of which is expressly incorporated herein by reference, particularly describes a bearing seal having an annular Belleville type spring embedded in rubber, and an annular retaining ring which is in metal-to-metal contact with the journal leg of the rock bit. The rubber embedding the spring is also bonded to the retaining ring. This patent is of interest to the present invention, because the basic structure of the preferred embodiment of the present invention, although having greatly strengthened metal-to-rubber bond, is quite similar to the seal structure described in the patent.

In this regard it is noted that a significant requirement for satisfactory operation of rock bit seals of the above-noted type, i.e. of seals which include a Belleville type seal and an embedding rubber material, is for the rubber to remain strongly bonded to the metal for a prolonged period of time, even during the harsh "downhole" operating conditions of the rock bit. The present invention provides a very significant improvement over the prior art in this regard.

U.S. Pat. Nos. 4,299,640; 4,333,785; 4,465,547; 3,416,975, and 1,954,403 are of interest, as further background to the present invention, because these patents relate, generally speaking, to the technology of bonding non-metallic materials to metals. U.S. Pat. No. 4,465,547 discloses a structure wherein polyvinylidene fluoride ($PVF_2$) is bonded to a metallic substrate by an adhesive, the $PVF_2$ having been subjected to a step of plasma etching prior to the application of the adhesive.

SUMMARY OF THE INVENTION

It is, generally speaking, an object of the present invention to provide an improved process for bonding rubber and like elastic materials to metal parts, particularly in connection with the construction of bearing seals and the like.

It is another object of the present invention to provide a rock bit seal of the type having a rubber sealing body which embeds a Belleville type metal spring, wherein the bonding strength of the rubber to the embedded metal parts is significantly improved.

It is still another object of the present invention to provide a process for preparing a rock bit seal of the type having a rubber sealing body embedding a Belleville type metal spring, wherein the bonding strength of the rubber to the embedded metal parts is significantly improved.

It is yet another object of the present invention to provide a rock bit seal of the type having a rubber sealing body which embeds a Belleville type metal spring, wherein the bonding strength of the rubber to the embedded metal parts is significantly improved and wherein the rubber has improved heat resistance.

It is a further object of the present invention to provide a rock bit seal of the type having a rubber sealing body which embeds a Belleville type metal spring, wherein the bonding strength of the rubber to the embedded metal parts is significantly improved, and wherein the rubber sealing body exhibits reduced friction relative to moving, mating metal surfaces.

The foregoing and other objects and advantages are attained by a process wherein a metal core of a sealing element, such as the Belleville spring type core of a rock bit seal, is cleansed by exposure to a chemical degreasing agent and is thereafter plasma etched prior to application of adhesive and prior to placement in a mold with partially cured elastomer. The elastomer is thereafter cured, preferably by application of heat. Experience has shown that the step of plasma etching the metal core prior to applying the adhesive greatly enhances the strength of the metal to elastomer bond in the finished product.

In the preferred embodiment of the process of the invention, an annular Belleville type spring and a retaining ring, similar to the structure shown in U.S. Pat. No. 3,370,895, is plasma etched before application of a primer and an adhesive. Thereafter, a highly saturated nitrile rubber composition having certain lubricating components, is applied to the spring and the ring in a mold, followed still further by final curing of the rubber composition to provide a seal having a metal-to-rubber bond of very high strength.

BRIEF DESCRIPTION OF THE DRAWINGS

FIG. 1 is an exploded perspective view of the metal parts to which rubber is strongly bonded in the bearing seal of the first preferred embodiment of the present invention;

FIG. 2 is a perspective view of the first preferred embodiment of the bearing seal of the present invention;

FIG. 3 is a cross-sectional view taken along lines 3,3 o FIG. 2;

FIG. 4 is a cross-sectional view showing, partially, a journal leg and a roller cone assembled to one another, and incorporating the first preferred embodiment of the bearing seal of the present invention;

FIG. 5 is an enlarged view showing the area designated 5 in FIG. 4;

DESCRIPTION OF THE PREFERRED EMBODIMENTS

Figure 6:
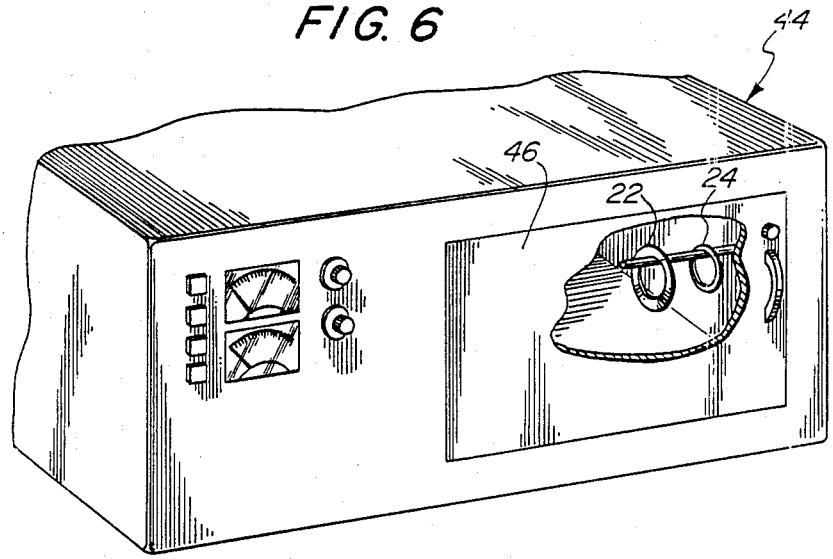
FIG. 6 is a schematic view showing the step of plasma etching in the process of the present invention.

The following specification taken in conjunction with the drawings sets forth the preferred embodiments of the present invention. The embodiments of the invention disclosed herein are the best modes contemplated by the inventors for carrying out their invention in a commercial environment, although it should be understood that several modifications can be accomplished within the scope of the present invention.

Referring now to the drawing Figures, and particularly to FIGS. 1 through 5, the basic construction and environment of the Belleville type rock bit seal 20 of the present invention is disclosed. In this connection it is noted that novel features of the rock bit seal 20 lie in the nature and composition of rubber used in the seal 20, in the presence of certain lubricating ingredients in the rubber, and in the manner of bonding the rubber to the metal components of the seal 20. These novel features, however, are not of such nature which can be readily discerned from the drawings of FIGS. 1 through 5. Accordingly, the structure illustrated on FIGS. 1 through 5 illustrates only the basic construction of the seal 20 which is described only to the extent necessary to explain the novel features of the invention. In this connection the description of the Belleville type seal in U.S. Pat. No. 3,370,895, is specifically incorporated herein by reference.

Thus, the seal 20 of the invention includes an annular spring 22 of frustoconical configuration, and a lock-ring 24 which fits within the interior of the annular spring 22. The spring 22 of the preferred embodiment is made of stainless steel preferably of the designation of 17-7 Ph of the Armco Company, or is equivalent to a steel of such designation. (As is well known in the art, the designation of 17-7 Ph is a standard industrial designation which signifies a chromium content of 17 percent a a nickel content of 7 percent.) An equivalent of this steel for making the spring 22 is carpenter 455. The lock-ring 24 of the preferred embodiment is made of mild steel having the designation 1018, or from a steel which is substantially equivalent thereto.

The annular spring 22 and the lock-ring 24 are embedded in rubber 26, as is shown on FIGS. 2 through 5. FIGS. 4 and 5 specifically illustrate the working environment of the rock bit seal 20. More particularly, the Belleville type seal 20 is disposed between a journal leg 28 of a roller cone type drilling bit (not shown) and a roller cone 30, so as to seal the interior of the roller cone 30 from drilling mud (not shown), cuttings (not shown), and other extraneous matter (not shown), and to keep the lubricating grease (not shown) within the interior of the roller cone 30. To accomplish these purposes the rubber 26 of the seal 20 has a substantially flat surface 32 in contact with the rotating roller cone 30. An exposed metal surface 34 of the lock-ring 24 and a portion 36 of the embedding rubber 26 are in contact with the journal leg 28, as is best shown on FIG. 5. Customarily, as in the herein-described preferred embodiment, the lock-ring 24 is welded to the journal leg 28, so that the seal 20 remains stationary as the cone 30 rotates.

Figure 7:
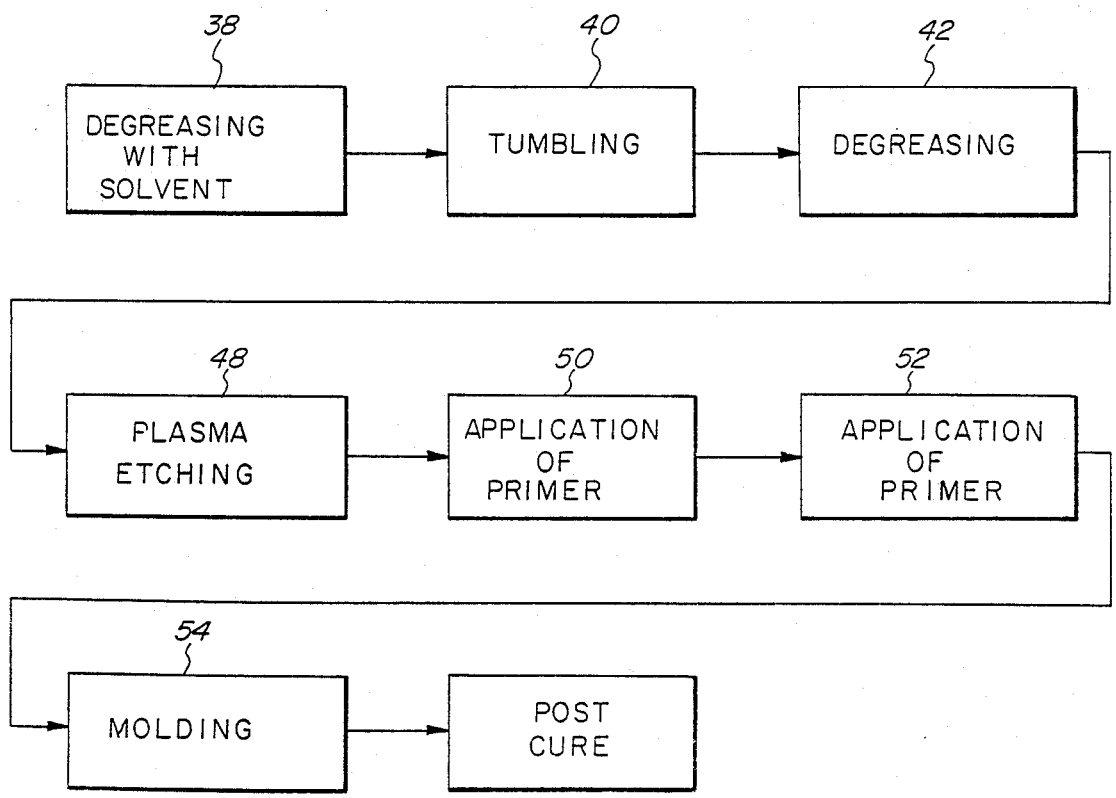
FIG. 7 is a block-diagram showing the steps of the process of preparing the bearing seal in accordance with the process of the present invention.

Referring now to FIGS. 6 and 7, the novel process of making the improved Belleville type seal 20 of the present invention is disclosed in detail, although it should be understood that the herein-described process is also useful for making other types of sealing elements wherein strong metal-to-rubber bonding is required.

Thus, in the herein-described process, the stainless steel spring 22 and lock-ring 24 are first degreased with an appropriate solvent, such as trichloroethane, and are therefter tumbled with alumina pellets (not shown), or the like, to roughen and clean their surfaces. After the step of tumbling, the annular spring 22 and lock-ring 24 are degreased again with trichloroethane, or like suitable solvent. The above-noted steps of degreasing, tumbling, and repeated degreasing are schematically illustrated on Figure 7 in boxes bearing the reference numerals 38, 40, and 42.

The next and significantly novel step in the process of making the seal 20 of the present invention comprises plasma etching illustrated on FIG. 6 of the appended drawings. In the herein-described preferred embodiment of the process, the plasma etching is performed in a BRANSON/IPC Series 4000 Model 4150 16" glow discharge gas plasma etching apparatus 44. The annular spring 22 and lock-ring 24 are first placed into a plasma chamber 46 of the apparatus 44 in such a manner so as to expose virtually all surfaces of the spring 22 and the ring 24 to the plasma. Preferably the parts are not allowed to contact one another, as is illustrated on FIG. 6. Thereafter, air is evacuated from the plasma chamber 46, and oxygen gas is introduced into the chamber 46 at a pressure of approximately 2.5 torr. Plasma is generated for approximately 2.5 minutes with a radio frequency power of approximately 1500 watts. The step of plasma etching is schematically shown on FIG. 7 in the box bearing reference numeral 48.

During the step of plasma etching the surfaces of the annular spring 22 and lock-ring 24 are cleansed of residual organic contaminants. Although the specific physical phenomena and effects which occur on the plasma etched metal surfaces are complex and not fully known, experience in connection with the present invention demonstrates that the wettability of the plasma etched surfaces is vastly improved with regard to the next step in the process of the present invention. Returning, however, still to the description of the step of plasma etching, it is noted that the above-described parameters of the plasma etching process are exemplary rather than limiting in nature. For example, gases other than oxygen, for example argon, could also be used in the plasma etching process. Moreover, the workable range of gas pressure for the process is approximately 0.3 to 0.7 torr, the workable range of radio frequency power is approximately 1000 to 2000 watts, and the time of exposure to the etching process is approximately 2 to 5 minutes. During the etching process, the metal spring 22 and the ring 24 do not get appreciably hot.

After the step of plasma etching, a primer is applied to the plasma etched metal surfaces of the annular spring 22 and ring 24. The application of primer is schematically shown on FIG. 7 in the box bearing the reference numeral 50. The application of primer per se is not new in connection with embedding metal parts in rubber; for example, a primer is also applied during the manufacture of the Belleville type seals of the prior art in order to prepare the metal surfaces for affixation of rubber.

The primer employed in connection with the process of the present invention is of the type well known and readily available in the art. In the herein-described preferred embodiment a titanium derivative containing commercial product CHEMLOCK 205 of LORD Hughson Chemicals of Erie, Pennsylvania is used. The primer is applied by spraying to all surfaces of the annular spring 22, and to those surfaces of the ring 24 which are to be bonded to the rubber 26. Preferably the applied primer should result in a coat of approximately 0.1 to 0.3 mil thickness. It is important in connection with the process of the present invention that the application of the primer to the plasma etched metal surfaces should follow within approximately 30 minutes, or less, after completion of the plasma etching.

The primer is allowed to dry at approximately room temperature for about 30 minutes. Thereafter, an adhesive is applied by spraying. The adhesive, the application of which is not new per se for the purpose of embedding metal parts in rubber, is of the type well known in the art for this purpose. In the herein-described preferred embodiment, CHEMLOCK 220 (of LORD Hughson Chemicals of Erie, Pa.) is used. The adhesive is sprayed on the metal parts 22 and 24 to become a coat of approximately 0.5 to 0.9 mil thickness. Consequently, the combined primer and adhesve coat on the metal parts 22 and 24 is approximately 0.6 to 1.2 mil thick. The application of the adhesive is schematically shown on FIG. 7 in the box bearing the reference numeral 52.

An alternative to the application of the above-described primer and adhesive is to apply, after the step of plasma etching, a single coating of another appropriate adhesive which is capable of functioning without a primer. Such adhesives are known in the art, Thixon 715AB of the Dayton Chemical Division of Whittaker Company, of West Alexandria, Ohio serves as an example.

Returning now to the description of the preferred process, the adhesive is allowed to dry at room temperature for approximately ½ hour. Thereafter the metal parts 22 and 24 are placed in a conventional molding equipment, together with a partially uncured rubber composition, to eventually result in the seal 20.

Several types of rubber compositions may be used in the molding step 54, such as EPDM rubbers or fluoroelastomer rubbers. It has been found, however, as another aspect of the present invention, that best results are obtained when highly saturated nitrile (HNS) rubber compositions are used for bonding. The composition of an HNS composition actually employed in a preferred embodiment is indicated below in a tabulated form.

| COMPOSITION OF HNS RUBBER COMPOUND USED FOR EMBEDDING THE METAL PARTS 22 AND 24 BY MOLDING | | |
| --- | --- | --- |
| ZETPOL 1020 Brand Partially Uncured (Sulfur Cured) Rubber | 100 | parts |
| VANOX ZMT Brand Antioxidant | 1.5 | parts |
| VANOX AM Brand Antioxidant | 1.5 | parts |
| ZnO Activator | 5.0 | parts |
| ASTM HAF N330 Brand High Abrasive Furnace Black (Carbon Black) | 50.0 | parts |
| Sulfur Vulcanizing Agent | 0.5 | parts |
| Methyltueds Accelerators | 2.0 | parts |
| ALTAX Brand Primary Accelerator | 1.5 | parts |
| Ethyltueds Accelerator | 1.5 | parts |
| CdO Lubricant | 2.72 | parts |
| DIXON KS-2 Brand Graphite Lubricant | 8.84 | parts |
| Silver, Very Finely Powdered (Lubricant) | 2.04 | parts |

Those skilled in the art will be readily familiar with the above-listed components of the rubber composition. For further reference regarding the nature of the components, the reader is directed to consult standard handbooks of the rubber industry, such as the Rubber World Magazine's BLUE BOOK, 1985 Edition, published by Lippincott & Peto, Inc., of Akron, Ohio.

With regard to the ZETPOL 1020 brand partially uncured, highly saturated, nitrile rubber, it is noted that the aforesaid composition is available from Nippon Zeon Co., Ltd., which is well known in the industry as one source of standard rubber compositions. The use of such a highly saturated nitrile rubber in a Belleville type rock bit seal is itself believed to be new and unusual in the art.

Moreover, those skilled in the art will recognize that plasticizing agents, such as dioctylphtalate, stearic acid, zinc stearate, or the like, are not present in the rubber composition used in accordance with the present invention. These ingredients are deliberately not utilized in order to improve bonding of the cured rubber to the metal parts 22 and 24.

Still further, those skilled in the art will recognize that the rubber composition used in the present invention includes certain lubricating agents, such as cadmium oxide, graphite, and finely powdered silver. Instead of these specific lubricating agents or in addition to them, molybdenum containing lubricants such as MOLYVAN$^R$ L (trade name of R. T. Vanderbilt Company, Inc., Norwalk, Connecticut) may also be added in approximate ratios of 5 parts to 100 parts of the ZETPOL 1020 rubber bake polymer MOLYVAN$^R$ L is known to comprise sulfurized oxymolybdenum organophosphorodithionate.

The use of these (or substantially equivalent) lubricating agents in the rubber composition of the present invention is novel. The use of such lubricating agents has been hitherto discouraged in the art, because it was generally accepted that the presence of lubricating agents in the rubber adversely affects the bonding of rubber to the metal parts. It was found, however, in accordance with the present invention that the seals 20 of the invention have significantly improved rubber-to-metal bonding, and that the friction of the rubber surface 32 against the rotating metal part of the roller cone 30 is nevertheless reduced.

The process of molding 54 the rubber composition to embed the metal parts is substantially standard. It is preferably conducted in the herein-described preferred embodiment for approximately 12 minutes at approximately 332° (Fahrenheit). This is followed by a post cure 56 of approximately 30 minutes at approximately 300° (Fahrenheit).

Advantages of the Belleville type seal 20 made in accordance with the present invention include improved heat resistance, lessened dynamic wear due to improved lubricity, and most significantly improved bonding of the rubber to the metal parts.

The improved rubber-to-metal bonding has been demonstrated in tests of the type which are considered standard in the industry for testing such bonds in rock bit seals. In these tests, the Belleville type seals 20 prepared in accordance with the present invention, and also in accordance with the prior art (without plasma etching), are kept in boiling water for approximately 16 hours to simulate the heat conditions of prolonged downhole drilling. Thereafter, an experienced technician used a vise-grip in a forceful attempt to tear off the rubber from the dynamic face, and from the static face of the seal 20, and also attempts to tear the lock-ring 24 out of the seal 20. Good rubber-to-metal bonding is present in the seal if the foregoing procedure results in tearing the rubber material, rather than in tearing rubber away from the underlying metal. Thus, the presence of bare metal areas in the test indicate poor rubber-to-metal bonding. The extent of these bare metal areas can be expressed in percentage numbers. The lower the ratio of the bare metal area to the total torn area (or the total area of metal bonded to rubber), the better is the rubber-to-metal bond. The test data obtained on seals 20 made in accordance with the present invention, involving plasma etching of the metal parts 22 and 24, show significantly improved rubber-to-metal bonding.

Inasmuch as several modifications of the above-described invention may become readily apparent to those skilled in the art in light of the present disclosure, the scope of the present invention should be interpreted solely from the following claims.

What is claimed is:

1. A method of fabricating a sealing element for a rotary cone drill bit, the sealing element being mounted between a journal bearing and a roller cone rotatively secured thereon, said sealing element fabrication process comprising the steps of:

forming an annular metal Belleville spring, said spring forming an inner periphery thereby;

forming an annular metal retaining ring dimensioned to loosely fit within said inner periphery of said annular metal Belleville spring;

cleansing said Belleville spring and said retaining ring by exposure to a liquid cleansing agent;

subjecting at least a portion of the surfaces formed by said Belleville spring and said retaining ring to a stream of plasma of oxygen gas at a radio frequency having the power range of approximately 1000 to 2000 watts for approximately 2 to 5 minutes, the gas having a pressure of approximately 0.3 to 0.7 torr to thereby etch said surfaces to further cleanse said surfaces from contaminants;

depositing an adhesive on the plasma etched surfaces after the step of plasma etching;

placing said Belleville spring and said retaining ring into a conventional Belleville sealing element mold together with an uncured or partially cured elastomer in contact with said adhesive; and curing said elastomer in the mold whereby the elastomer becomes strongly bonded to said Belleville spring and said retaining ring.

* * * * *